United States Patent [19]
Bauver, II et al.

[11] Patent Number: 6,083,302
[45] Date of Patent: Jul. 4, 2000

[54] MIST ELIMINATOR FOR WET GAS SCRUBBING

[75] Inventors: Wesley P. Bauver, II, Granville; David K. Anderson, East Longmeadow, both of Mass.; William H. Kingston, Knoxville, Tenn.

[73] Assignee: ABB Environmental Systems, division of ABB Flakt, Inc., Knoxville, Tenn.

[21] Appl. No.: 09/133,617

[22] Filed: Aug. 13, 1998

[51] Int. Cl.⁷ .............................. B01D 45/08; B01D 47/06
[52] U.S. Cl. ................ 95/216; 55/440; 95/235; 95/267; 96/356
[58] Field of Search .................. 95/267, 235, 216, 95/221, 222; 96/356, 358, 325, 326; 55/440, 443, 442, 464

[56] References Cited

U.S. PATENT DOCUMENTS

| | | | |
|---|---|---|---|
| 3,348,466 | 10/1967 | Lane et al. | 96/356 |
| 3,757,498 | 9/1973 | Hurlbut, Sr. et al. | 55/440 |
| 3,813,855 | 6/1974 | Hill et al. | 55/440 |
| 3,849,095 | 11/1974 | Regehr | 55/440 |
| 3,912,471 | 10/1975 | Cotton, Jr. | 96/356 |
| 4,072,478 | 2/1978 | Regehr et al. | 96/356 |
| 4,141,706 | 2/1979 | Regehr | 55/440 |
| 4,157,250 | 6/1979 | Regehr et al. | 96/356 |
| 4,198,215 | 4/1980 | Regehr | 55/440 |
| 4,204,847 | 5/1980 | Ko | 96/356 |
| 4,543,108 | 9/1985 | Wurz | 55/440 |
| 4,601,731 | 7/1986 | Michelson | 96/356 |
| 5,104,431 | 4/1992 | Fewel, Jr. | 55/440 |
| 5,268,011 | 12/1993 | Wurz | 55/440 |
| 5,269,823 | 12/1993 | Wurz | 96/356 |
| 5,464,459 | 11/1995 | VanBuskirk et al. | 55/440 |
| 5,486,341 | 1/1996 | Bresowar | 23/243.01 |
| 5,662,721 | 9/1997 | Bresowar | 95/235 |

FOREIGN PATENT DOCUMENTS 2735753  2/1979  Germany ................. 55/440

OTHER PUBLICATIONS

"Incorporating Full–Scale Experience Into Advanced Limestone FGD Designs," Rader et al., cover page and pp. 1–17.
"Mist Elimination System Design and Specification for FGD Systems," Jones et al., 11 pages.

*Primary Examiner*—Duane S. Smith
*Attorney, Agent, or Firm*—St. Onge Steward Johnston & Reens LLC

[57] ABSTRACT

Sulfur oxides ($SO_x$) are scrubbed from combustion effluents with greater system reliability when an improved mist eliminator of the invention is employed. The mist eliminator has at least one section, preferably two sections, with two passes followed by an extended trailing edge. This design is shown in tests to be as effective as four pass designs, while being easier to clean. Encrustation and plugging are greatly reduced.

24 Claims, 9 Drawing Sheets

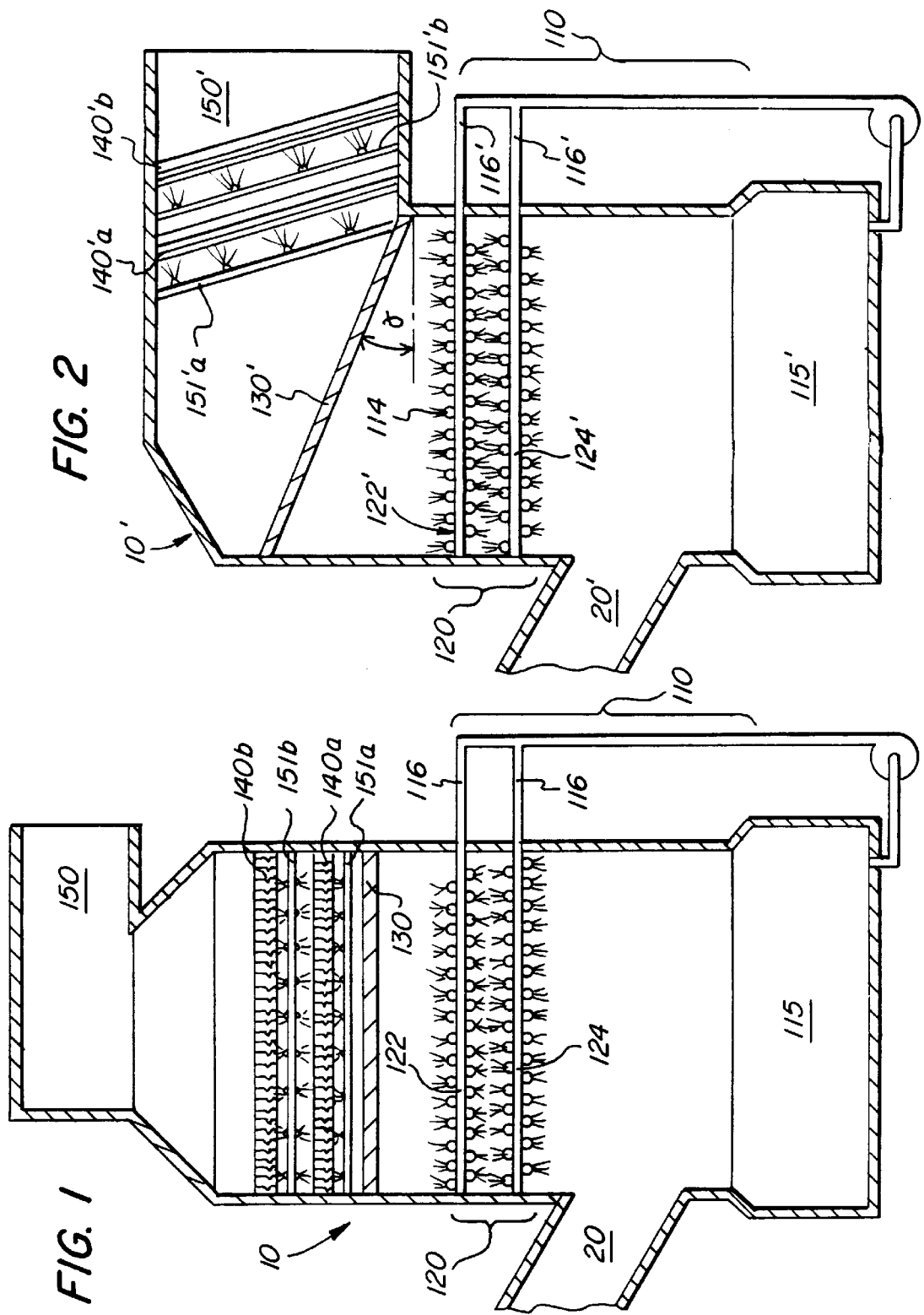

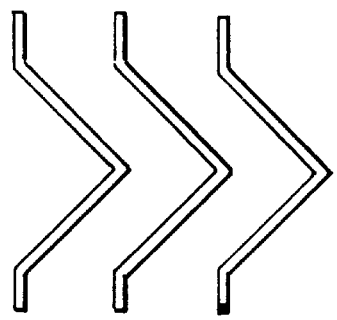
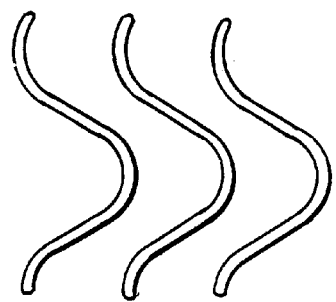
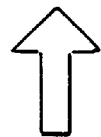
FIG. 3
(PRIOR ART)
FIG. 4
(PRIOR ART)
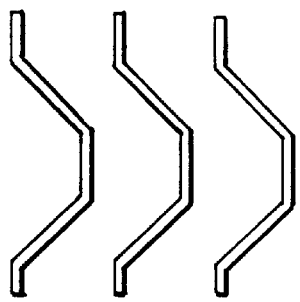
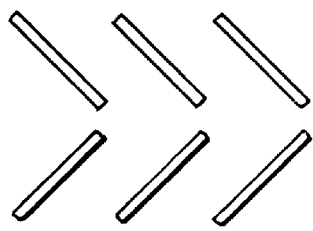
FIG. 5
(PRIOR ART)
FIG. 6
(PRIOR ART)

MIST ELIMINATOR FOR WET GAS SCRUBBING

TECHNICAL FIELD

The invention relates to improvements facilitating more efficient elimination of mist from gas-liquid contact equipment, such as from wet scrubbers used to remove sulfur oxides ($SO_x$) from combustion effluents.

Limestone-based wet scrubbing systems for flue gas desulfurization (FGD) are typical of large-scale gas-liquid systems needing mist elimination. They operate at high superficial gas velocities in order to improve contact efficiency, and the gas streams tend to carry significant amounts of entrained liquid with them.

The use of mist eliminators in one or more stages is a known manner of dealing with the problem of entrained liquid. Among the design challenges is a trade off between efficiency of droplet removal, cleanability and pressure drop across the mist eliminator. Efficiency and pressure drop are adversely affected by encrustation (solids buildup). When cleaning is incomplete, encrustation can become so severe that plugging can occur and, in fact, has been identified as the second most common cause of flue gas desulfurization system outages.

The removal of entrained liquid droplets from a gas stream can be accomplished more easily by the use of high pressure drop devices than by those operating at lower pressure drop. Generally, droplet removal efficiency increases as pressure drop increases. However, high pressure drops increase fan power costs and should be minimized.

There is a need for means and methods to improve wet scrubbing and other technologies depending on gas-liquid contact with the removal of entrained liquid from the effluent gas by enabling more efficient removal of entrained liquid droplets with high throughput, low pressure drop and low tendency to cake or encrust with solids carried in the liquid.

BACKGROUND ART

Open FGD spray towers (i.e., those not having packings, trays or other means for facilitating gas-liquid contact) are simple in design and provide high reliability. They achieve intense gas-liquid contact and inherently entrain significant amounts of liquid in the effluent. Mist eliminators are employed to reduce the entrained liquid to an acceptable level. For a general discussion, see, for example, Rader and Bakke, in *Incorporating Full-Scale Experience Into Advanced Limestone Wet FGD Designs*, presented at the IGCI* Forum 91, Sep. 12, 1991, Washington, D.C. (*formerly the Industrial Gas Cleaning Institute, now the Institute of Clean Air Companies, Washington, D.C.).

As a practical matter, mist eliminators are designed to achieve a balance between droplet removal efficiency and pressure drop. Droplet removal efficiency improves with increases in initial droplet removal and decreases in reentrainment. Increases in fan power required to account for gas flow pressure drop across a mist eliminator can be a significant portion of the total system power usage.

Most mist eliminators for commercial FGD systems are of the impaction type—droplets of liquid are removed from a flowing gas stream by impacting with a surface. Larger droplets impact an obstruction placed in the line of flow because they tend to continue in a straight line regardless of changes in the direction of gas flow. Smaller droplets can follow the gas flow and avoid contact with obstructions. Impaction separators can take several forms, including rod banks, mesh pads, chevron and zig-zag baffles.

FIGS. 3–6 show various commercial impaction separators of the chevron type. They are formed of parallel, spaced vanes and can be used in both vertical and horizontal installations. They are all shown to have two passes, i.e., vane surfaces that change the direction of the gas flow. A stage is comprised of one or more adjacent passes. In the Figures, they are shown in one stage but are typically used in two stages and have been also used in one and three stage installations. Depending on many factors, stages can be comprised of one to four passes.

Total liquid removal efficiency is the difference between initial droplet removal and the amount of liquid reentrainment. The first should be maximized and the latter minimized. Among the factors favoring initial droplet removal are spacing between the individual impaction surfaces and the variation in the angle of these surfaces with respect to the direction of gas flow, the turn length for the zig-zag surfaces, the number of changes in gas flow direction (passes) and the number of stages. All of these factors, to the extent they can improve initial droplet elimination, affect pressure drop. A discussion of commercial mist eliminator design is provided by Jones, Mcintush, Lundeen, Rhudy, and Bowen, in *Mist Elimination System Design and Specification for FGD Systems*, presented Aug. 26, 1993, at the 1993 $SO_2$ Control Symposium, Boston, Mass.

In some cases, gas straighteners are employed in the form of extended trailing edges of the vanes of a given stage. In some cases, these can improve multi-stage efficiency by adjusting the direction gas flow from one stage to the next. Also, hooks or channels on mist eliminator vanes have been employed to improve drainage of liquid collected. These features can reduce reentrainment by providing a protected drainage path for the liquid. These additional elements can, however, increase pressure drop and are difficult to keep clean in systems with suspended solids or precipitates.

Critical to pressure drop, initial droplet removal and reentrainment is the ability to clean the mist eliminator vanes while in continuous operation. Cleaning must be done in a manner effective to prevent encrustation, and with minimal entrainment of wash water. Commercial experience has been that increasing gas flow above certain velocities (higher for horizontal flow than for vertical) reentrainment can increase to unacceptable levels. The use of additional passes within a stage can reduce this tendency, but it makes cleaning the exit sides of the vanes very problematic because wash water should be applied to only the entrance side and not the exit. Introducing wash water at the exit side will unacceptably increase reentrainment as a portion of this liquid becomes entrained in the gas.

There is a need for a mist eliminator that will operate well at low superficial gas velocities, continue to function with low pressure drops and high removal efficiencies at high velocities, and be capable of effective cleaning.

DISCLOSURE OF THE INVENTION

It is an object of the invention to provide improved apparatus to provide efficient mist elimination with minimal reentrainment for both horizontal and vertical gas flow configurations.

It is another object of the invention to provide a mist eliminator design which can be washed on-line without losing collection efficiency due to reentrainment as has been experienced by the prior art.

It is another and more specific object of the invention to improve mist elimination with minimal reentrainment over a greater range of gas variances.

These and other objects are accomplished by the invention, which provides both improved processes and apparatus for wet scrubbing.

In one aspect, the invention provides a mist eliminator for reducing the concentration of droplets entrained in a gas stream flowing through a passage, between an inlet and an outlet, comprising: a plurality of mist eliminator vanes held in parallel alignment, wherein each vane has an inlet side and an outlet side, each vane includes two passes and a trailing edge at the outlet side, the length of the trailing edge is desirably from about 100 to about 250% of the width of a vane transverse to the direction of gas flow, and adjacent vanes are spaced so that a peak formed by the intersection of the two passes of one fits within a trough formed by the intersection of the two passes of the other.

Preferably, the first of the two passes of the individual vanes is oriented at an angle of from 23° to 54° with respect to the direction of bulk gas flow. The width of a vane in the direction of flow is desirably from about 3.5 to about 5 times the width of a vane transverse to the direction of gas flow. The dimension of the trailing edge in the direction of flow is desirably from about 25 to about 60% of the width of a vane in the direction of gas flow.

The vanes are arranged generally transversely to a gas stream. In a horizontally flowing gas stream, the vanes preferably extend with the trailing edge oriented generally vertically to enhance drainage. The vanes can also be positioned generally transversely to a vertically-flowing gas stream.

Also provided is a mist eliminator system comprising two mist eliminator sections (stages), at least one of which is as defined above. Preferably, in applications where solids are present, means are provided for at least periodically spraying water at the mist eliminator surfaces for cleaning.

Also provided is an improvement in any wet scrubbing apparatus, such as or reducing the concentration of $SO_x$ in flue gases, said apparatus being of the type comprising, an inlet for flue gases, an outlet for the flue gases, a spray zone positioned between the inlet and the outlet, wherein the improvement comprises: providing at least one mist eliminator as defined above.

The invention further provides an improvement in any process employing gas-liquid contact due to operation at higher gas velocities, such as of the type where a flow of flue gas containing $SO_x$ is directed upwardly through a vertical scrubbing tower, a spray of an aqueous slurry of $SO_x$-reducing reagent is introduced from a plurality of spray levels within a spray zone to contact the flue gas while descending through the tower countercurrently to the flow of flue gas, the slurry is collected and a portion of it is recycled for contact with the flue gases, wherein the improvement comprises: passing the flue gasses through at least one mist eliminator as defined above.

BRIEF DESCRIPTION OF THE DRAWINGS

The invention will be better understood and its advantages will be better appreciated from the following detailed description, especially when read in light of the accompanying drawings, wherein:

FIG. 1 is a schematic view of a single-loop, open-tower, countercurrent wet scrubber with two stages of vertical-flow mist eliminator assemblies;

FIG. 2 is a schematic view of a single-loop, open-tower, countercurrent wet scrubber with two stages of mist eliminator assemblies, one with vertical flow and the other horizontal;

FIGS. 3–6 are schematic drawings showing in cross section, of several single-stage, commercially-available chevron mist eliminator vane configurations;

INDUSTRIAL APPLICABILITY

Figure 8:
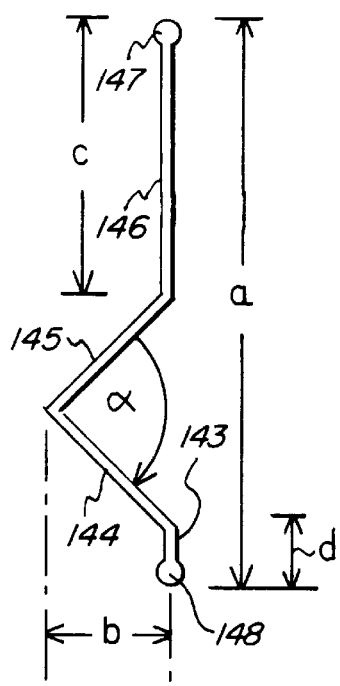
FIG. 8 is a cross-sectional view of one preferred form of vane for a mist eliminator of the invention.

The improvements of the invention have preferred application to FGD treatment of utility boiler flue gases, and this embodiment will be described for purposes of illustrating the invention and its advantages. The invention is not limited to this embodiment and gas streams from all types of gas-liquid contact systems and effluents from all types of combustion sources are envisioned.

FIGS. 1 and 2 illustrate single-loop, open-tower, countercurrent wet scrubbing towers (10 and 10') for removing sulfur oxides, principally as $SO_2$, from combustion effluents according to the invention. For ease of description, structures in FIG. 2 that are similar to those in FIG. 1, will be given the same reference numeral, distinguished by a prime. Thus, tower 10 in FIG. 1 corresponds to tower 10' in FIG. 2. The embodiment of FIG. 1 shows two mist eliminator stages 130 and 140a/140b arranged for contact with vertically-flowing gases. Associated with these latter are wash means 151a/151b.

The embodiment of FIG. 2 shows two mist eliminator stages, having stage 130' arranged for contact with vertically-flowing gases and the other 140'a/140'b for contact with horizontally-flowing gases. Associated with these latter are wash means 151'a/151'b. In either the arrangement of FIG. 1 or that of FIG. 2, a single-pass bulk entrainment separator can be employed as a preliminary stage, followed by one or more further stages. The configuration of FIG. 2 can be operated at high superficial gas velocities, which present the greatest challenge. Embodiments of this type can be most greatly benefited by the invention. U.S. Pat. No. 5,486,341, to Bresowar relates to a scrubbing arrangement of this kind, and its entire disclosure is incorporated herein by reference.

The arrangement of FIG. 1 (also, FIG. 2) shows effluent, preferably cleaned of particulates, such as by an electrostatic precipitator or fabric filter, passed via duct 20 to wet scrubbing tower 10 wherein it flows upwardly, countercurrent to a spray of an aqueous slurry which contains limestone discharged within a vertical scrubbing section 110 including a spray zone 120 having a plurality of spray levels 122, 124. From the scrubbing section 110, the gas continues past spray 114 through gas outlet duct 150. The tower is configured to direct a flow of flue gas upwardly through the vertical scrubbing section. The scrubbed effluent is significantly freed of entrained droplets of liquid by bulk entrainment separator 130 and mist eliminator 140 and discharged to a stack via duct 150.

The scrubbing slurry falling through the vertical scrubbing section 110 is collected in reaction tank 115. The reaction tank 115 is preferably of a size suitable to permit reaction of the $SO_2$ with the calcium carbonate to form crystals of gypsum having a weight median diameter sufficiently large to assure their separation by suitable means. Slurry is constantly being withdrawn from tank 115 and recycled to spray zone 120 by suitable pumps and piping, including spray headers 116. Calcium sulfite and/or calcium sulfates are constantly removed, and fresh alkaline calcium feed is provided as known.

Vertical superficial gas velocities in the embodiment of FIG. 1 generally fall within the range of from about 1 to about 4 meters per second. In the case of FIG. 2, they can exceed about 7 meters per second.

The bulk entrainment separator 130 can be of a design as disclosed in the noted U.S. Pat. No. 5,486,341 to Bresowar.

Figure 7A:
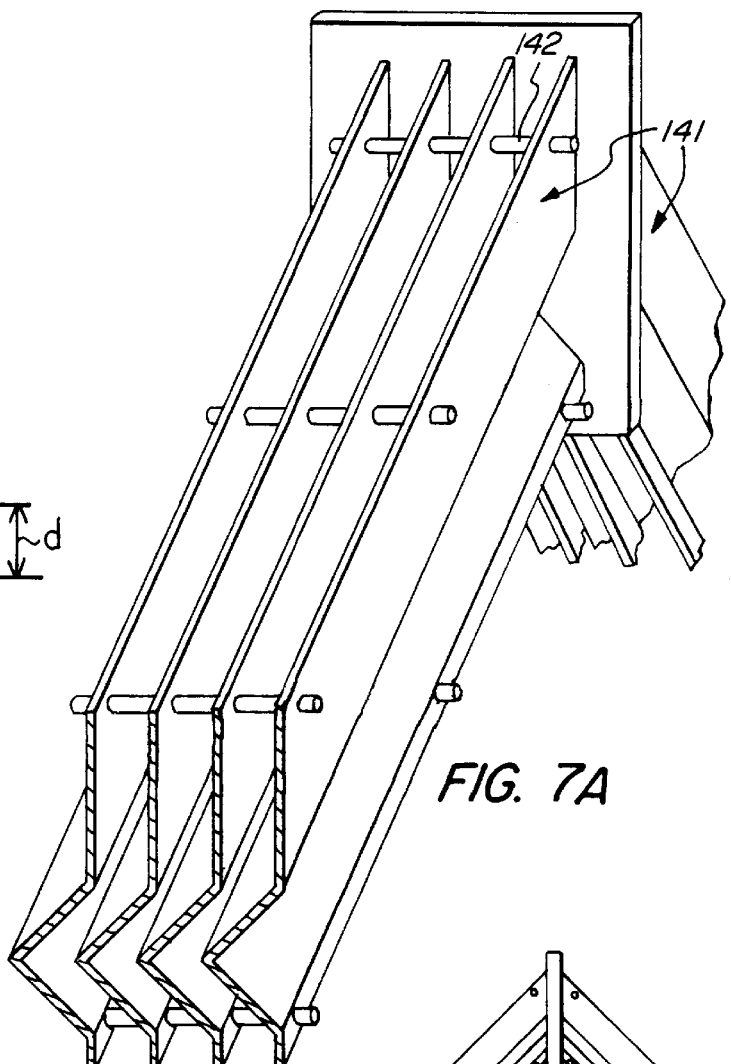
FIGS. 7a and 7b show in perspective, greater detail of vane assembly and an A-frame arrangement for a vertical-flow mist eliminator of the invention.
Figure 7B:
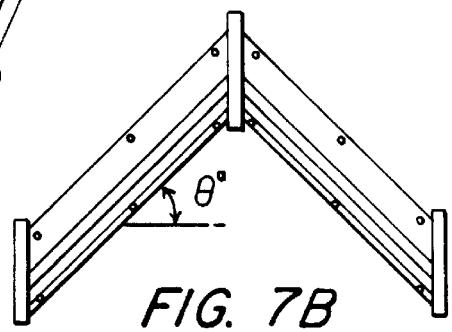

FIGS. 7a and 7b show in perspective, greater detail of vane assembly and an A-frame arrangement for a vertical-flow mist eliminator of the invention with angle $\Theta$ defining the angle between a vane and the horizontal. A plurality of individual vanes 141 are held in parallel alignment with each other by a series of rods 142 or bolts, shims or other means. A profile of a single vane is shown in FIG. 8 to illustrate some of its detail in a preferred form. The illustrated vane is seen to comprise an inlet surface 143, a first pass surface 144, a second pass surface 145 and a trailing edge surface 146. The length of the pass surfaces is shown to be equal (can also be unequal) and the angle $\alpha$ between the first pass and the direction of bulk gas flow is typically between about 23° and 54°, and preferably from 40° to 50°, e.g., about 45°. The width of an individual vane in the direction of flow is shown in the drawing as a. The width of the vane transverse to the direction of flow is shown as b. And, the length of the trailing edge surface is shown as c.

It has been determined that several relative dimensions are important to achieve the objectives of the invention. The relative length of the passes and the spacing of the vanes should be sufficient to permit the apex formed by two passes of one vane to extend into the trough formed by the two passes of the next adjacent vane. The degree to which the apex of one vane extends into the trough of another, is typically no greater than 60% and no less than about 20% of dimension c, preferably from about 35 to about 45%. The dimension c is desirably from about 100% to about 250% of b, e.g., from about 150 to about 200%. And, dimension c is typically from about 25% to 60% of dimension a, e.g., about 40 to 50%. Also, typically, the dimension a will be from about 3.5 to about 5 times that of b, e.g., preferably from 4 to 4.5 times.

In one exemplary embodiment, dimension a is 10.25 inches, b is 2.5 inches and c is 4.5 inches, and a leading edge fin 143 is provided with a dimension d of 1 inch. A preferred spacing of adjacent vanes is 1.5 inches. Extended trailing edge 146 is terminated by an aerodynamic and structually stiffening extension 147 which serves to retain the liquid carried on the vane while permitting the gases crossing it to flow with a minimum of turbulence to the next stage. This feature is especially advantageous for the first stage of a two-stage mist eliminator. Leading edge 148 is preferably of aerodynamic shape suitable to the conditions of operation to provide streamlined flow at least to the first pass of the first mist eliminator.

Figure 9:
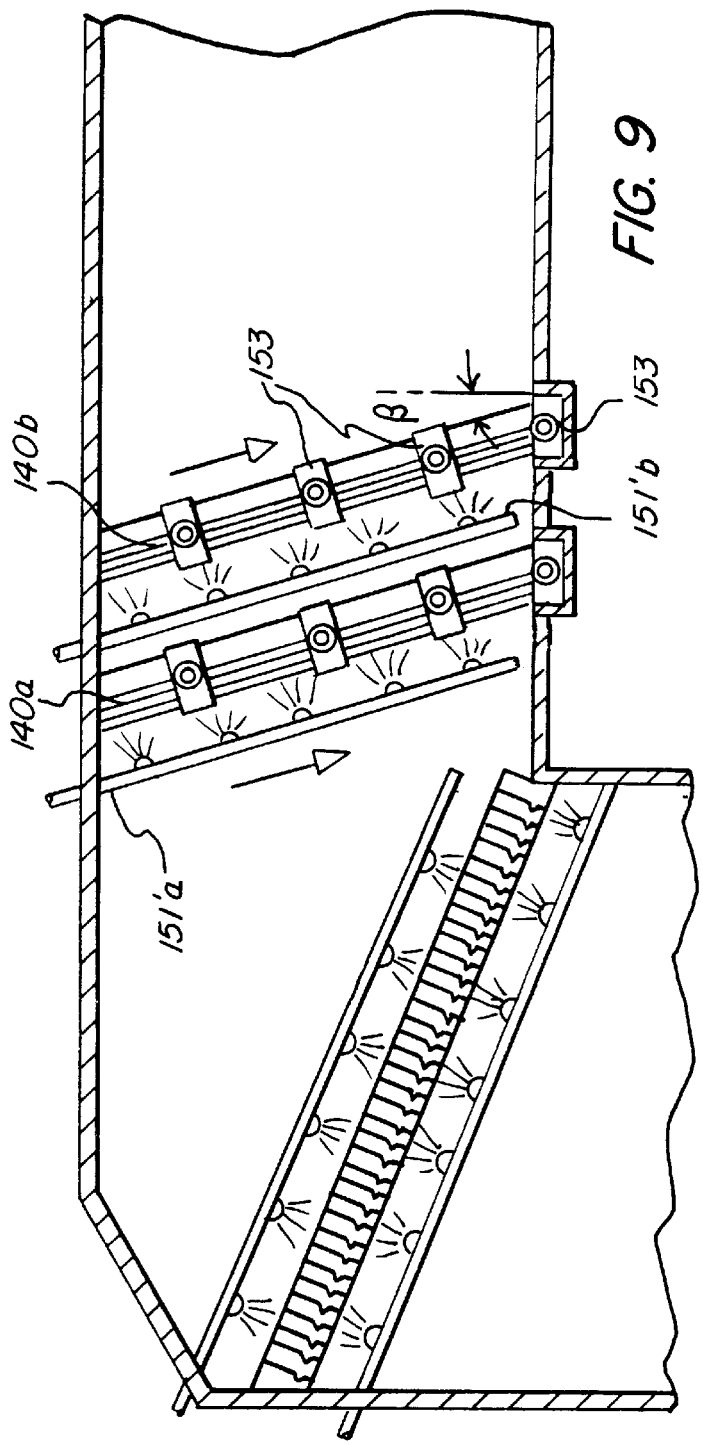
FIG. 9 is a cut-away cross-sectional view of the upper portion of a scrubber of the type shown in FIG. 2, but with the mist eliminator slanted from the vertical to provide better drainage.

FIG. 9 is a cut-away cross-sectional view of the upper portion of a scrubber of the type shown in FIG. 2, but with a pair of mist eliminators 140a and 140b, each preceded with a wash header 151a and 151b carrying a plurality of wash nozzles 152. The nozzles are preferably of the kind that provides a conical spray, and the spray patterns are arranged to provide coverage of the entire front surfaces of the mist eliminators. The exact spray pattern, degree of overlap, and frequency and volume of dispensing of wash water, depend on many factors unique to the individual installation.

Drain boxes 153 are positioned as needed to collect the liquid draining down the vanes of the mist eliminators. Each of the mist eliminators 140a and 140b is preferably slanted from a vertical line by an angle $\beta$ to provide better drainage, but in some cases $\beta$ can be 0°. The angle $\beta$ will be effective to permit liquid collected by the mist eliminator to reduce reentrainment from a vertically-oriented mist eliminator by utilizing the flow of gases to help it drain. In other words, the rate of advance of the liquid toward the drain box will be increased by the forward component of gas flow.

Figure 10:
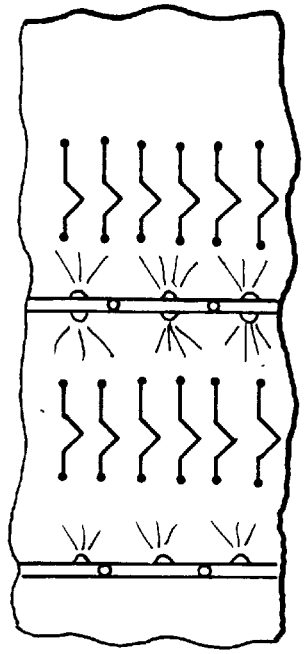
FIG. 10 is a schematic, cross-sectional top view of a two-stage, two-pass, horizontal-flow mist eliminator of the invention with washing prior to each stage.

FIG. 10 is a schematic, cross-sectional view of the two-stage, two-pass, horizontal-flow mist eliminator shown in FIG. 9.

The following Experimental section is provided to further illustrate the invention, but is not intended to be limiting in any regard.

Experimental

Figure 11:
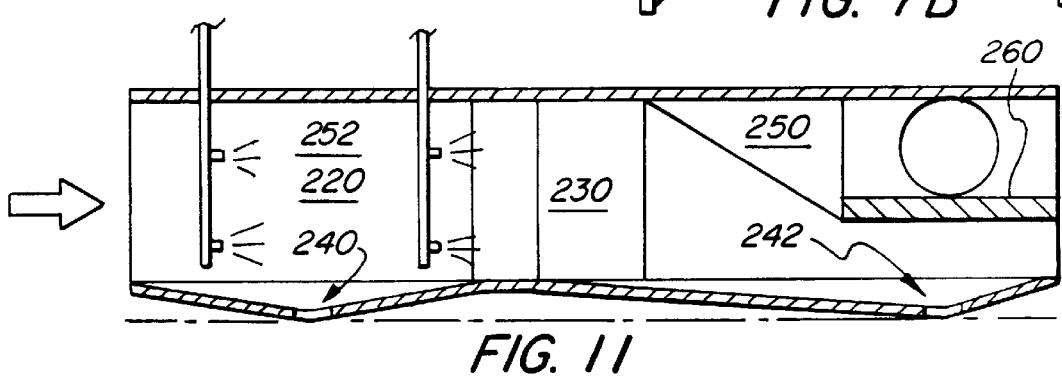
FIG. 11 is a schematic view of the test rig used for experimentation described in the Experimental section of this description.

Mist eliminator (ME) performance evaluation was performed in a test rig shown schematically in FIG. 11. The facility can accept mist eliminators 230 with cross sectional dimensions of up to 3 ft. (0.91 m) wide by 6 ft. (1.82 m) high. This size was selected to minimize wall effects and provide sufficient height to permit evaluation of the liquid film build up along the height of the mist eliminators. An 8-foot (2.44 m) section 220 upstream of the mist eliminators provides for the entrainment of liquid droplets via nozzles 252 and a uniform air velocity distribution into the mist eliminators. Downstream of the mist eliminators is a 9-foot (2.74 m) section of ductwork 250 that expands and transitions into a high-efficiency, wire-mesh collector 260. Liquid which is collected on the mist eliminators drains into a trough. Large droplets leaving the mist eliminators are collected in hoppers 240 and 242 upstream of the wire mesh collector 260. Final hopper 242 provides for accumulation of water from the wire mesh collector itself.

Four types of tests were run in the test rig: droplet size distribution which passes through the mist eliminators was determined using a Greenfield Instruments Video Droplet Analyzer (VDA). The VDA was located approximately 18 inches (0.46m) downstream of the mist eliminators. Actual distance varied due to different mist eliminator dimensions.

Collection efficiency was determined by weight measurement of water collected from each drainage point of the facility. Collection efficiency for the mist eliminators was defined as:

$$\text{Eff.} = M_{me}/(M_{me} + M_{co} + M_{final})$$

Where:

Eff.=Collection Efficiency
$M_{me}$=Mass collected by mist eliminators
$M_{co}$=Mass recovered downstream of mist eliminators
$M_{final}$=Mass recovered by final were mesh collector Pressure drop across the mist eliminators was determined by static pressure measurements at wall taps ahead of and downstream of the mist eliminators. These measurements were taken during collection efficiency tests.

Cleanability tests were run by first coating the mist eliminator blades with vegetable oil and then flour. These materials were selected based on some preliminary tests to find materials which would adhere well to the blades, require substantial wash flow for removal and be environmentally benign. Prior to being coated, the blades were painted black. This provided good contrast between clean and coated areas. After the wash cycle, the mist eliminator assemblies were removed from the facility and disassembled. Wash effectiveness was determined based on removal of the coating from the blades. The results from this simulation agreed closely with actual field experience.

A total of six mist eliminator configurations were evaluated in the test rig. Collection efficiency, droplet penetration and pressure drop for the first five are summarized in FIGS. 12a and 12b. These compare performance of the mist eliminators at comparable operating conditions. The collection efficiency test results are based on a liquid loading of 1.16 gpm/ft (0.79 kg/in sec) with wash flow provided by two Bete WL-12-90 nozzles. These conditions are typical of the scrubber unit shown in FIG. 2.

The STD 4-pass (standard 4-pass) design was tested first to obtain baseline performance information. This design has provided acceptable mist elimination performance in operating units but has been hard to clean, especially in the rear two passes. The rear pass of the 4-pass design was removed to provide a 3-pass design. Tests of this design indicated reduced collection efficiency, while cleanability of the final pass was still limited. Ribs were added at the inflection points of the chevrons in an attempt to improve performance. These ribs resulted in a further decrease in collection efficiency. The curved two-pass ME vane with hooks was also tested in a one stage configuration. Test results showed the collection efficiency of a single stage (2-pass) ME vane was low compared to others considered, only, was poor. Results of testing of similar designs in a two-stage configuration indicate that collection efficiencies are in the range of 0.00003 gpm/ft$^2$ (0.00002 kg/in$^2$ sec). Cleaning tests of this design showed that the hooks effectively stopped the movement of liquid along the blade and prevented wash water from reaching the 2nd pass.

Based on previous studies which showed good performance of two-stage systems, the standard 4-pass design was redesigned as a two-stage, two-pass system. Computational fluid dynamics (CFD) results had indicated that the first passes of the 45° chevron design were effective in initial collection of drops and it was known that the first two passes of this design were cleanable. A straight trailing edge of 1.5" (38 mm) was used on both stages. The stages were separated by a distance of 30" (762 mm) to permit access and wash nozzles for each stage, if required.

Figure 13:
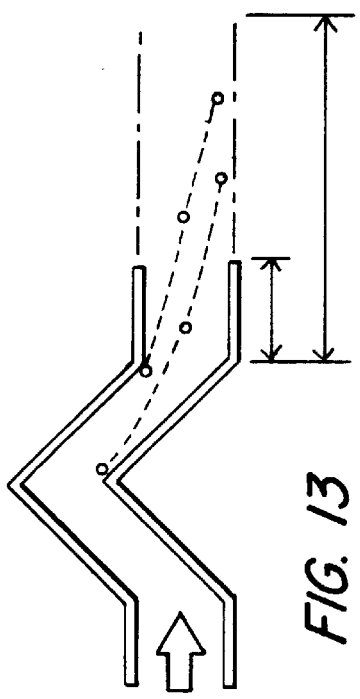
FIG. 13 is a schematic profile view helpful in explaining how a significant number of droplets reentrained from vane high points escape a mist eliminator of conventional design, but can be removed according to the invention.

Tests of this design showed a slight decrease in collection efficiency compared to the standard 4-pass design. Observations during testing indicated that drops were being reentrained off the inflection point of the chevrons. The trajectories of the drops were being influenced by the airflow in the rear of the blades such that the droplet passed behind the trailing edge of the blades as shown in FIG. 13. Droplets will re-entrain from the points indicated as "local high velocity points" due to the tendency for liquid to accumulate at these points and the gas velocity is higher than the average. These droplets exit the vane at a slight angle which will impact an extended vane surface and be re-collected.

In an attempt to reduce reentrainment, extended trailing edges were added to the blades as shown. The idea was that if they were made of a suitable length, it might be possible to intersect the paths of drops that had been re-entrained and recapture them. It was determined that this did indeed occur. In addition, the extended trailing edges were found to provide additional surface area for drainage. Advantageously, this design is also easily cleanable. Previous tests and field experience had shown that the first two passes of the four-pass design could be cleaned. Advantageously, the new design with the extended trailing edge does not inhibit the movement of wash flow along the blades.

Figure 12A:
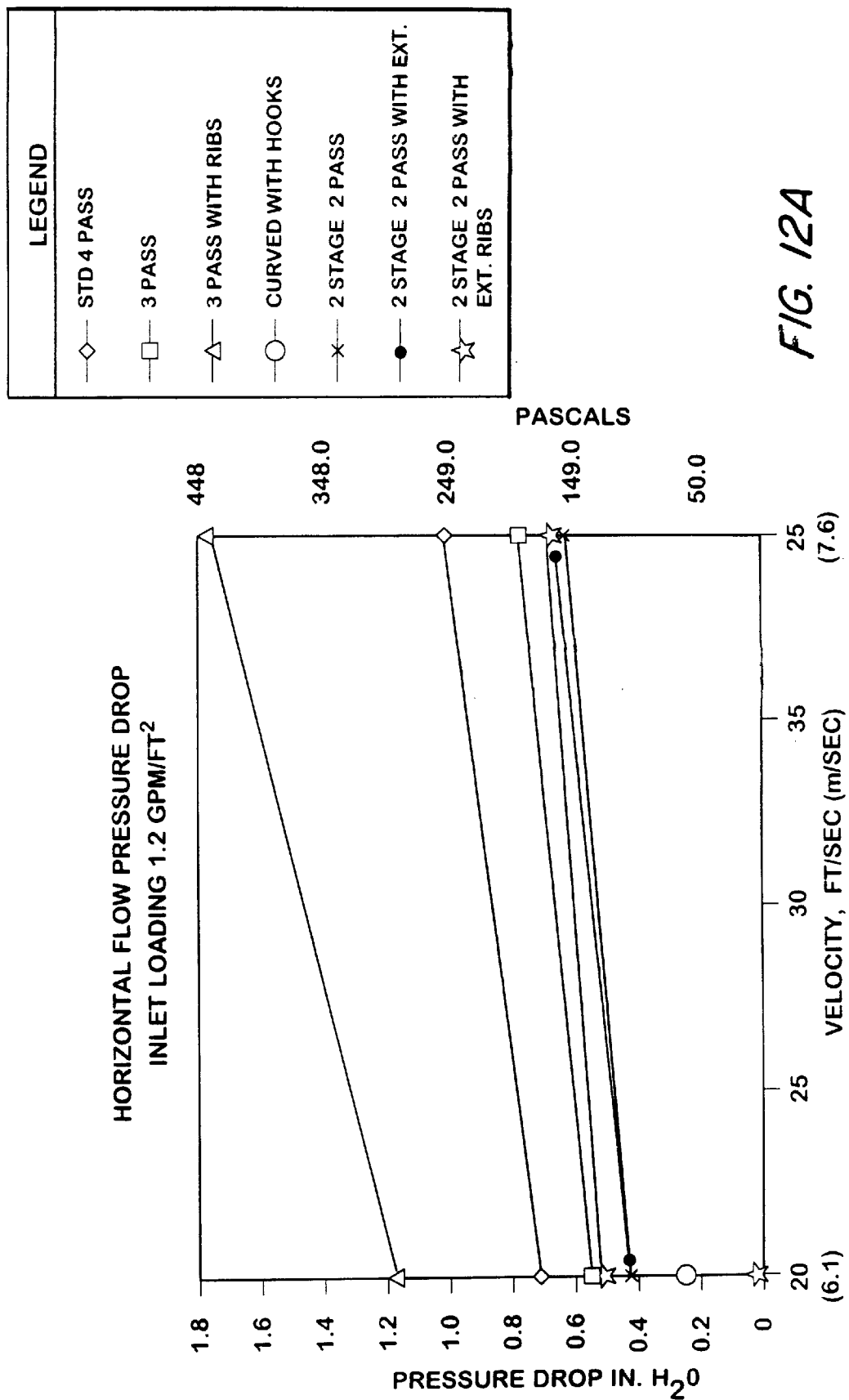
FIGS. 12a and 12b graphically depict data from tests on horizontal flow mist eliminators.
Figure 12B:
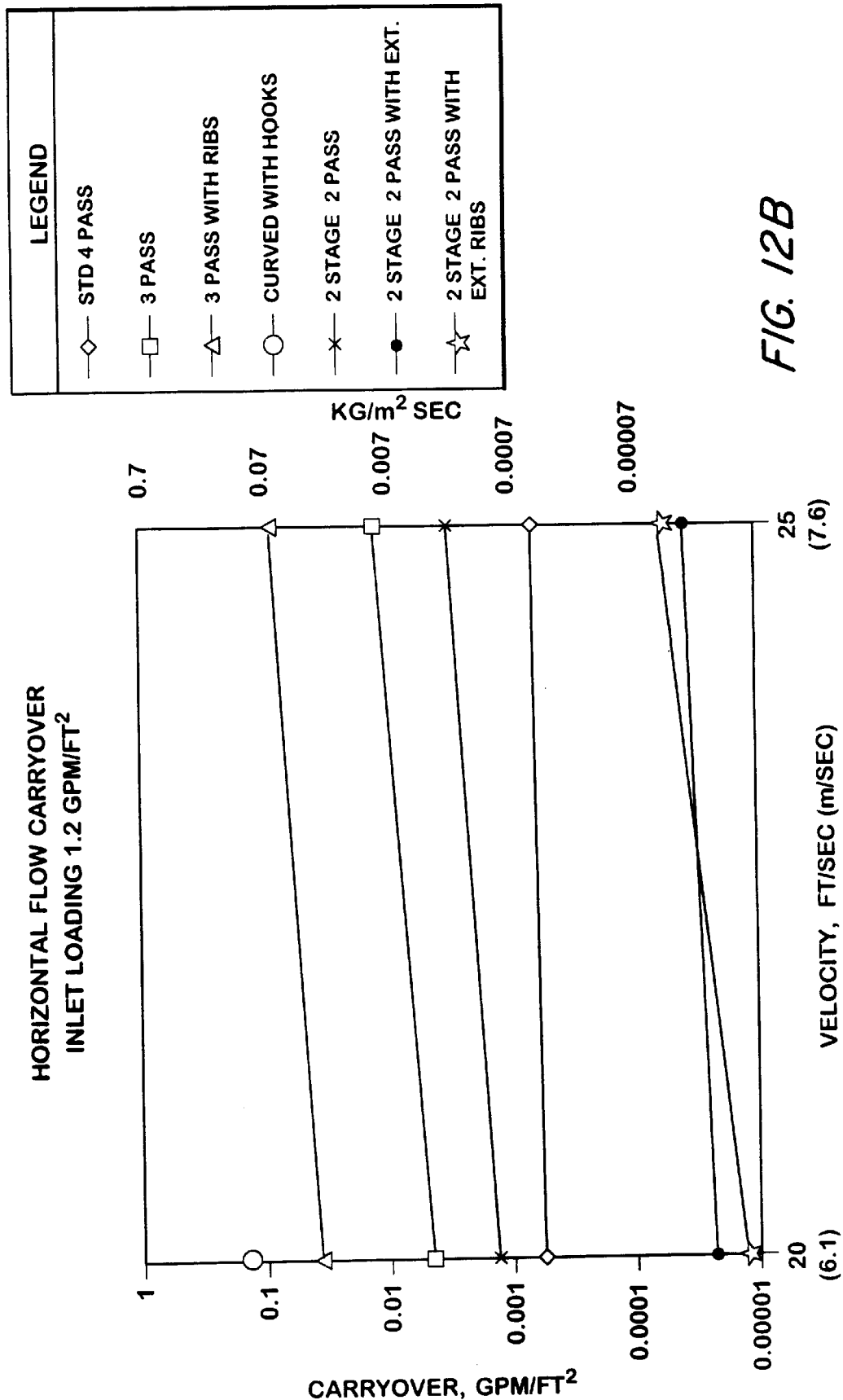

As can be seen from FIG. 12a, the collection efficiency of the two-stage design with extended trailing edges (2×2+) was better than all other designs tested. Improved efficiency of the two-stage configuration is achieved by providing a gap between stages sufficient (e.g., 1 or more meters) to permit any large reentrained droplets from the first stage to drop out before reaching the second stage. This has the effect of providing an extended drainable surface. In the four-pass design, liquid is pushed along the blades by the airflow. This can be seen as droplet tracks and stream tubes of water which moves along the blades. In the two-stage design, the drops which reach the rear of the blades and are shed, are now in free fall. Most contact the floor before reaching the next stage. The second stage therefore has a much lower liquid loading than the first stage. Since reentrainment is a function of liquid loading, it is greatly reduced for the second stage.

The 2×2+ blades were modified by the addition of ¼" plastic tubing to the trailing edges. It was hypothesized that this rib could further improve drainage and minimize reentrainment, since the trailing edges being tested were thin and droplets reaching this point were easily reentrained. Test results showed no definitive improvement with the ribs, however this may be partially due to being at the limits of experimental accuracy. Furthermore this rib design was not considered optimum. A rib with a flattened rear section would provide increased surface area in a low velocity zone to improve drainage.

Ranking of mist eliminator performance in terms of droplet penetration as a function of size is not as simple as ranking collection efficiency and pressure drop. In order to evaluate penetration (vs. re-entrainment) it was necessary to introduce a range of droplet sizes which spanned the penetration topsize of the ME blades. Based on CFD results and previous experience, this was expected to be in the range of 25 microns. A pair of twin fluid atomizers was used to provide an inlet size distribution of 0 to 70 microns.

TABLE 1

Drop sizes Penetrating Mist Eliminator

| Configuration | 20 ft/sec inlet velocity | | | 25 ft/sec inlet velocity | | |
| --- | --- | --- | --- | --- | --- | --- |
| | Dmax | D90 | D50 | Dmax | D90 | D50 |
| STD 4-pass | 26.1 | 24.8 | 11.4 | 17.6 | 14.9 | 10.7 |
| 3-pass | 28.1 | 24.6 | 14.1 | 30.8 | 27.3 | 15.2 |
| Curved with hooks | 60 | 60 | 13.9 | 23.8 | 20 | 11.8 |
| 2-stage, 2-pass with ext. | 29.8 | 27.5 | 14.1 | 34.3 | 29.4 | 21.2 |

TABLE 1-continued

Drop sizes Penetrating Mist Eliminator

| Configuration | 20 ft/sec inlet velocity | | | 25 ft/sec inlet velocity | | |
|---|---|---|---|---|---|---|
| | Dmax | D90 | D50 | Dmax | D90 | D50 |
| 2-stage, 2-pass with ext. and trailing edge ribs | 37.9 | 26.8 | 16.1 | 24.5 | 21.1 | 9.1 |
| 2-stage, I-pass with ext. | 49.5 | 36.8 | 24.8 | | | |

The inlet loading was kept low (less than 0.1 gpm/ft$^2$) to prevent re-entrainment. As previously discussed, droplet size distribution downstream of the mist eliminators was measured by a Video Droplet Analyzer (VDA). The VDA cannot distinguish between droplets which pass through the blades and re-entrained droplets. The information shown in Table 1 must therefore be regarded with this in mind. It is unlikely that 60-micron droplets get through the curved mist eliminators with hooks. The single 60-micron droplet which was measured is most likely a re-entrained droplet. It can be surmised that none of the mist eliminators tested permits droplets larger than 50 microns to pass through the vanes.

Past work by others has shown that the performance of mist eliminators can be improved by tilting the tops of blades into the flow. This enhances drainage along the blades due to the component of air flow along the blades. A series of tests were run to evaluate the performance of the 2×2+ mist eliminator blades with a 15 degree forward tilt, as shown in FIG. 10.

Figure 14A:
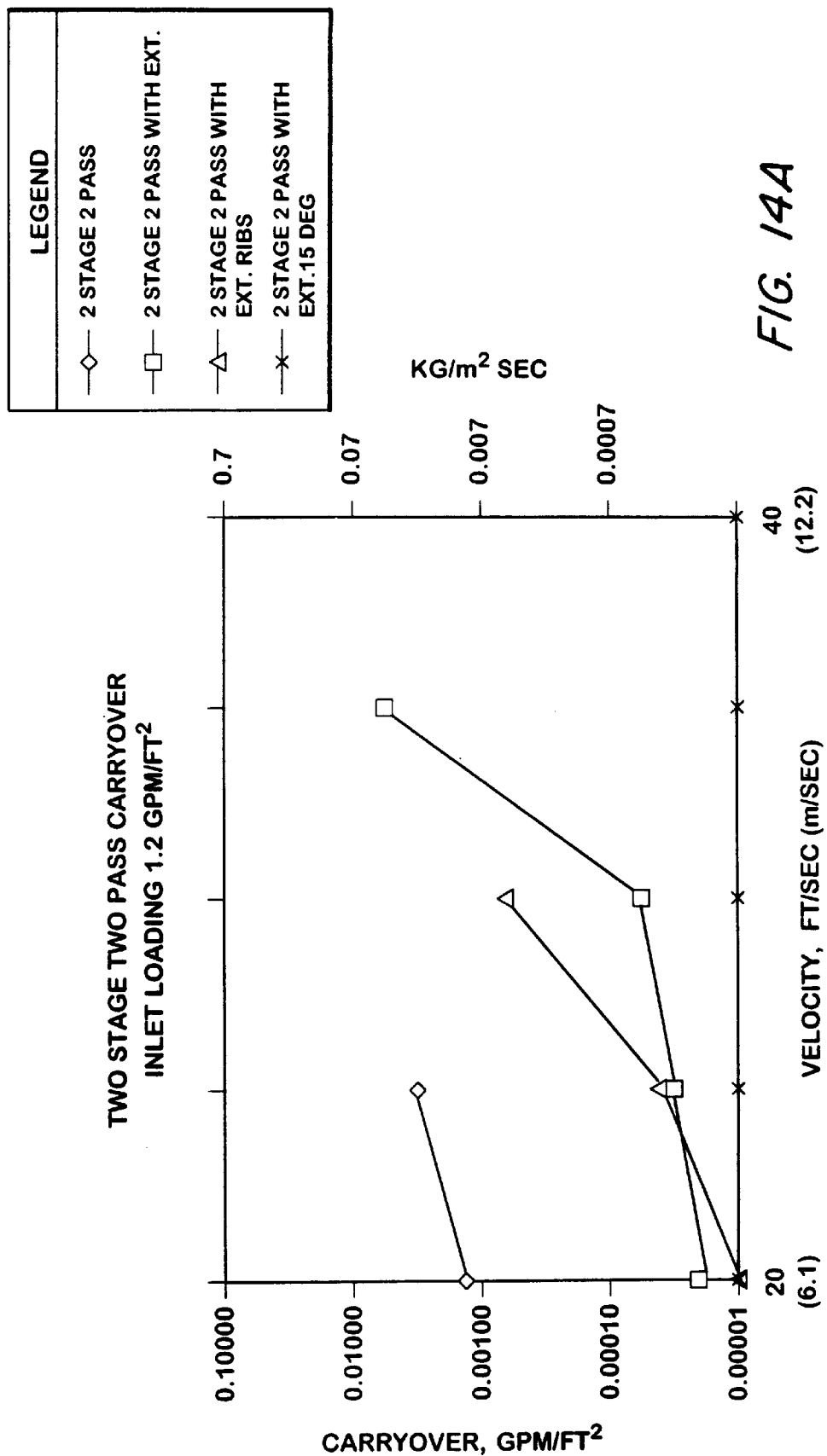
FIGS. 14a and 14b graphically depict data from tests on two-stage, two-pass mist eliminators.
Figure 14B:
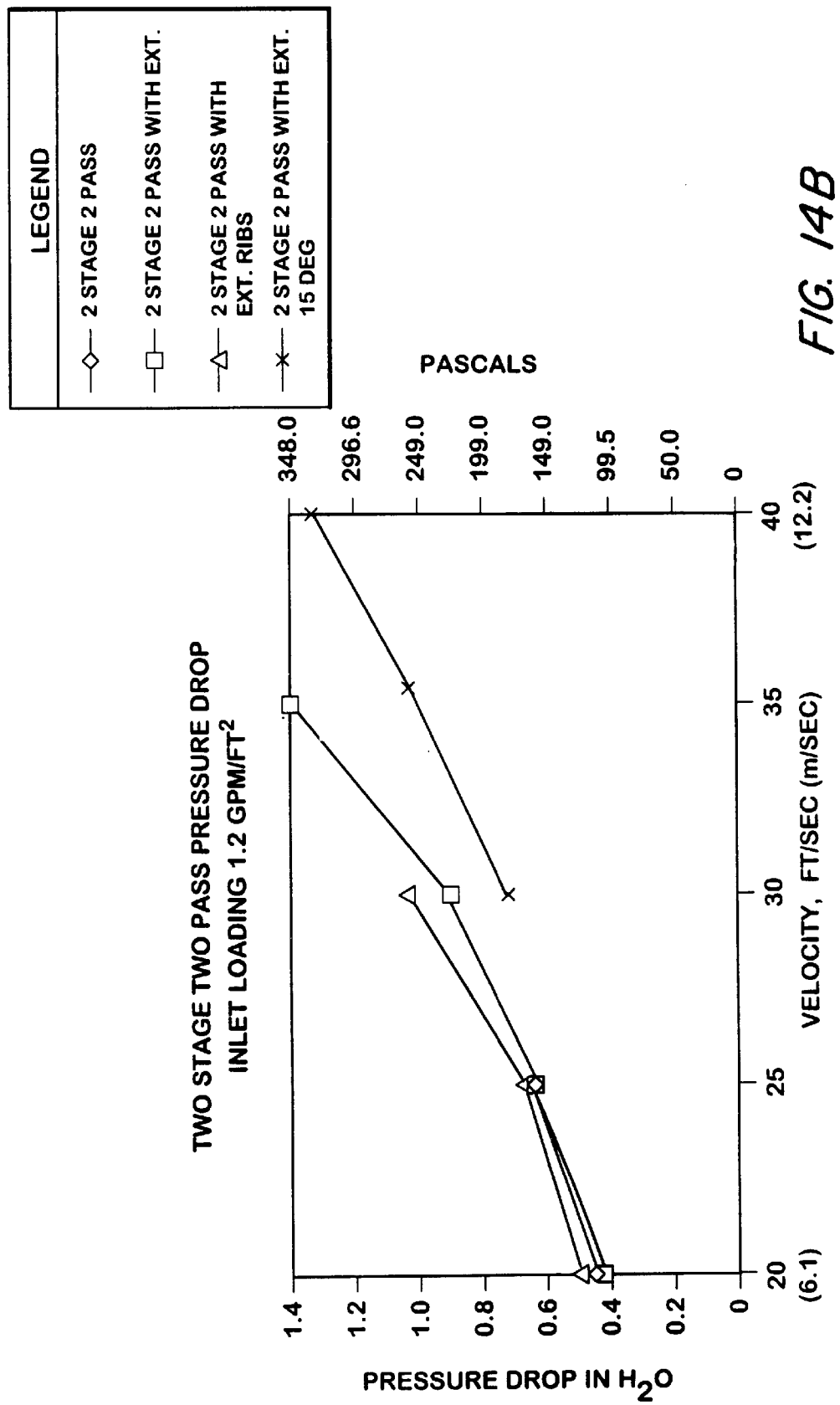

Based on their superior performance at 20 and 25 ft/sec (6.1 and 7.6 rn/see), the 2×2+ configurations were tested at higher gas velocities. As shown in FIGS. 14a and 14b collection efficiency is still excellent at 30 ft/sec (9.1 m/sec). At 35 ft/sec (10.7 m/sec) collection efficiency is still comparable to the standard four-pass design at 20 ft/sec (6.1 m/sec). At up to 40 ft/sec (12.2 m/sec), there was no measurable carryover for the forward-tilted design. This was seen at inlet loadings of up to 2.2 gpm/ft$^2$ (1.5 kg/m$^2$ sec).

Figure 15:
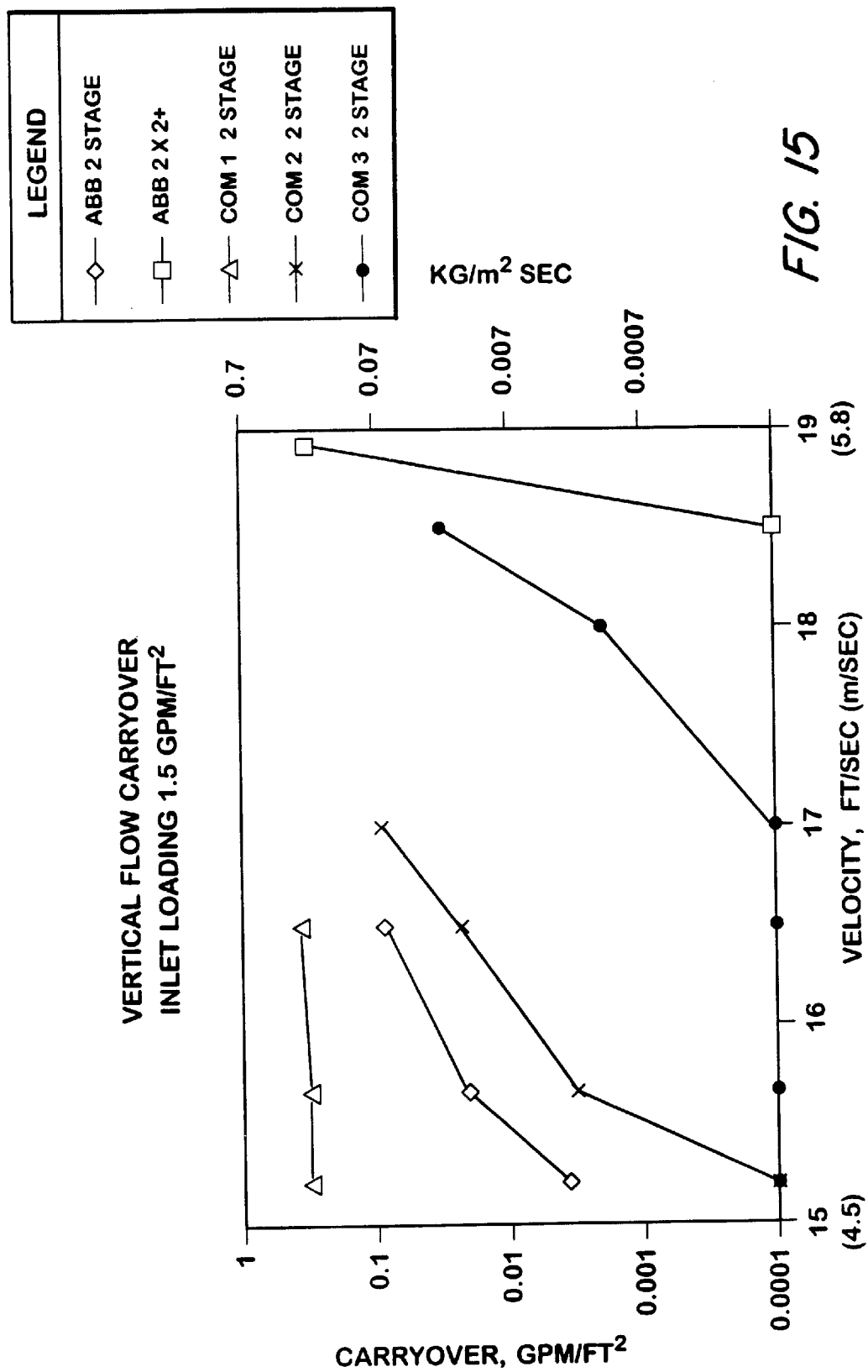
FIG. 15 graphically depicts data from tests on a vertical flow mist eliminator.

Based on the success of the horizontal gas flow configuration, the test rig was modified for, and the 2×2+ mist eliminators were evaluated in, vertical flow. The lowest velocity at which carryover was measurable was 18.9 ft/sec (5.76 m/sec) as shown in FIG. 15. This performance is as good as or better than that of other commercially-offered two-stage mist eliminators for vertical flow. As with the horizontal gas flow application, these mist eliminators will be cleanable on line.

The goal of identifying a mist eliminator design which can be washed on-line without the loss of collection efficiency appears to be satisfied with the 2-stage, 2-pass, with extended trailing edge design.

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence that is effective to meet the objectives there intended, unless the context specifically indicates the contrary.

What is claimed is:

1. A mist eliminator for reducing the concentration of droplets entrained in a gas stream flowing through a passage, between an inlet and an outlet, comprising: a plurality of mist eliminator vanes held in parallel alignment, wherein each vane has an inlet side and an outlet side, each vane includes two passes and a trailing edge at the outlet side, the length of the trailing edge is of sufficient length in the direction of gas flow to intersect the trajectories of drops reentrained off of upstream vane surfaces, said trailing edge having a length in the direction of gas flow of from 100 to 250% of the width of the vane transverse to the direction of the gas flow, and adjacent vanes are spaced so that a peak formed by the intersection of the two passes of one fits within a trough formed by the intersection of the two passes of the other.

2. A mist eliminator according to claim 1 wherein the first of the two passes of the individual vanes is oriented at an angle of from 23° to 54° with respect to the direction of bulk gas flow.

3. A mist eliminator according to claim 1 wherein the width of a vane in the direction of flow is from about 3.5 to about 5 times the width of a vane transverse to the direction of gas flow.

4. A mist eliminator according to claim 1 wherein the dimension of the trailing edge in the direction of flow is from about 25 to about 60% of the width of a vane in the direction of gas flow.

5. A mist eliminator according to claim 1 wherein the length of the trailing edge is from about 150 to about 200% of the width of a vane transverse to the direction of gas flow.

6. A mist eliminator according to claim 1 wherein the vanes are positioned generally transversely to a horizontally-flowing gas stream.

7. A mist eliminator according to claim 6 wherein the vanes extend with the trailing edge oriented generally vertically to enhance drainage.

8. A mist eliminator according to claim 1 wherein the vanes are positioned generally transversely to a vertically-flowing gas stream.

9. A mist eliminator assembly comprising two mist eliminators, at least one of which is as defined in claim 1.

10. A mist eliminator assembly according to claim 9 wherein the mist eliminator nearest the inlet side is as defined in claim 1.

11. A mist eliminator assembly according to claim 10 wherein the vanes are positioned generally transversely to a horizontally-flowing gas stream.

12. A mist eliminator assembly according to claim 11 wherein means are provided for at least periodically spraying water at the mist eliminator nearest the inlet.

13. A mist eliminator assembly according to claim 11 wherein the mist eliminator nearest the inlet is slanted such that its upper end is nearer the inlet end than its lower end.

14. An improvement in a wet scrubbing apparatus for reducing the concentration of $SO_x$ in flue gases, said apparatus comprising, an inlet for flue gases, an outlet for the flue gases, a spray zone positioned between the inlet and the outlet, wherein the improvement comprises:

providing at least one mist eliminator as defined in claim 1.

15. An apparatus according to claim 14 wherein the vanes of the mist eliminator are positioned generally transversely to a horizontally-flowing gas stream.

16. An improvement in a wet scrubbing apparatus for reducing the concentration of $SO_x$ in flue gases, said apparatus comprising, an inlet for flue gases, an outlet for the flue gases, a spray zone positioned between the inlet and the outlet, wherein the improvement comprises:

providing a mist eliminator assembly as defined in claim 10.

17. An apparatus according to claim 10 wherein the vanes of the mist eliminator assembly are positioned generally transversely to a horizontally-flowing gas stream.

18. An apparatus according to claim 10 wherein the vanes of the mist eliminator assembly are positioned generally transversely to a vertically-flowing gas stream.

19. A process according to claim 10 wherein the vanes of the mist eliminators are mounted in an A-frame arrangement.

20. An improvement in a process where a flow of flue gas containing $SO_x$ is directed upwardly through a vertical scrubbing tower, a spray of an aqueous slurry of $SO_x$-reducing reagent is introduced from a plurality of spray levels within a spray zone to contact the flue gas while descending through the tower countercurrently to the flow of flue gas, the slurry is collected and a portion of it is recycled for contact with the flue gases, wherein the improvement comprises:

passing the flue gasses through at least one mist eliminator as defined in claim 1.

21. A process according to claim 20 wherein the gases are passed through two mist eliminators as defined in claim 1.

22. A process according to claim 20 wherein the vanes of the mist eliminators are positioned generally transversely to a horizontally-flowing gas stream.

23. A process according to claim 20 wherein the vanes of the mist eliminators are positioned generally transversely to a vertically-flowing gas stream.

24. A process according to claim 20 wherein the vanes of the mist eliminators are mounted in an A-frame arrangement.

* * * * *